United States Patent [19]
Benrud et al.

[11] 3,742,467
[45] June 26, 1973

[54] SENSE-DIGIT LINE SELECTION MATRIX FOR MEMORY SYSTEM

[75] Inventors: Vernal M. Benrud; Richard L. Horst, both of St. Paul, Minn.

[73] Assignee: Sperry Rand Corporation, New York, N.Y.

[22] Filed: Dec. 15, 1971

[21] Appl. No.: 208,147

[52] U.S. Cl.340/174 RC, 340/174 DA, 340/174 TF, 340/174 WA

[51] Int. Cl. .......................... G11c 7/00, G11c 11/14

[58] Field of Search .............. 340/174 RC, 174 WA, 340/174 DA, 174 TF

[56] References Cited

UNITED STATES PATENTS

| | | | |
|---|---|---|---|
| 3,465,312 | 9/1969 | Nelson | 340/174 RC |
| 3,693,176 | 9/1972 | Kenner | 340/174 DA |
| 3,405,399 | 10/1968 | Chong et al. | 340/174 TB |
| 3,181,132 | 4/1965 | Amemiya | 340/174 WA |

*Primary Examiner*—James W. Moffitt
*Attorney*—Kenneth T. Grace et al.

[57] ABSTRACT

Means for addressing a sense-digit line of a group of sense-digit lines that form part of a selection matrix for a magnetizable memory system is disclosed. The group addressing means is a matrix of eight FET transistors for gating one of eight associated active sense-digit lines and one FET transistor for gating an associated dummy sense-digit line for reading and writing. The particular design is directed to a selection system in which the associated word line drive is an AC word drive $H_T$ for both reading and writing while the associated sense-digit line drive is a bipolar pulsed DC digit drive $H_L$, the polarity of which determines the data state of the conjointly effected magnetizable memory element.

2 Claims, 6 Drawing Figures

Patented June 26, 1973 3,742,467

4 Sheets-Sheet 2

SENSE-DIGIT LINE SELECTION MATRIX FOR MEMORY SYSTEM

BACKGROUND OF THE INVENTION

Magnetizable memory systems utilizing combined AC, DC drive signals for memory operation are well known. In the V. A. Ehresman U.S. Pat. No. 3,599,191 selection of a particular memory element for writing is achieved by the concurrent application of a DC transverse write drive field to a first digit line and a first or second and opposite polarity DC longitudinal write drive field to a first word line while reading is achieved by the concurrent application of two different frequency RF longitudinal read drive fields to a second digit line and a DC transverse read drive field to a second word line providing a resultant sum-frequency RF output signal on the second digit line, the polarity phase of which is indicative of the information state of the selected memory element.

In the oligatomic magnetizable memory system of the D. S. Lo et al. U.S. Pat. No. 3,550,101 a different selection scheme is utilized. In this arrangement selection of a particular memory element for writing is achieved by the concurrent application of an AC transverse write drive field to a word line and a bipolar pulsed DC longitudinal write drive field to a sense-digit line while reading is achieved by the application of an AC transverse read drive field to the word line and reading out the so generated AC output signal along the sense-digit line. The present invention is directed toward a means for addressing or selecting one of a group of active sense-digit lines of such oligatomic memory system for both reading and writing. Also incorporated is a dummy sense-digit line selection scheme—see dummy wire selection schemes of the J. M. Cline U.S. Pat. No. 3,510,856 and the A. E. Leipa U.S. Pat. No. 3,533,083 as related to plated wire memory systems.

SUMMARY OF THE INVENTION

The present invention is directed toward a circuit for selecting one of a group of associated active sense-digit lines and the one associated dummy sense-digit line for both reading out of and writing into the oligatomic magnetizable memory system of the D. S. Lo et al. U.S. Pat. No. 3,550,101. Because the oligatomic magnetizable memory system is comprised of a continuous thin film of ferromagnetic material in the order of 250–1,000 angstroms (A) in thickness with the associated printed circuit word and sense-digit line overlays, novel selection signals and circuits are required. Additionally, to eliminate the polarity phase detection problem, circuitry is included for concurrently selecting one of the group associated active sense-digit lines and the one associated dummy sense-digit line while also permitting the separate writing of the dummy memory element along the dummy sense-digit line into a reference state which upon readout is, along with the output signal from the selected active memory element, coupled to a differential sense amplifier for improved signal/noise performance. FET transistors are utilized as the low level gates for the selection of the active dummy sense-digit lines for both the reading and writing operations.

DESCRIPTION OF THE PREFERRED EMBODIMENT

Figure 1:
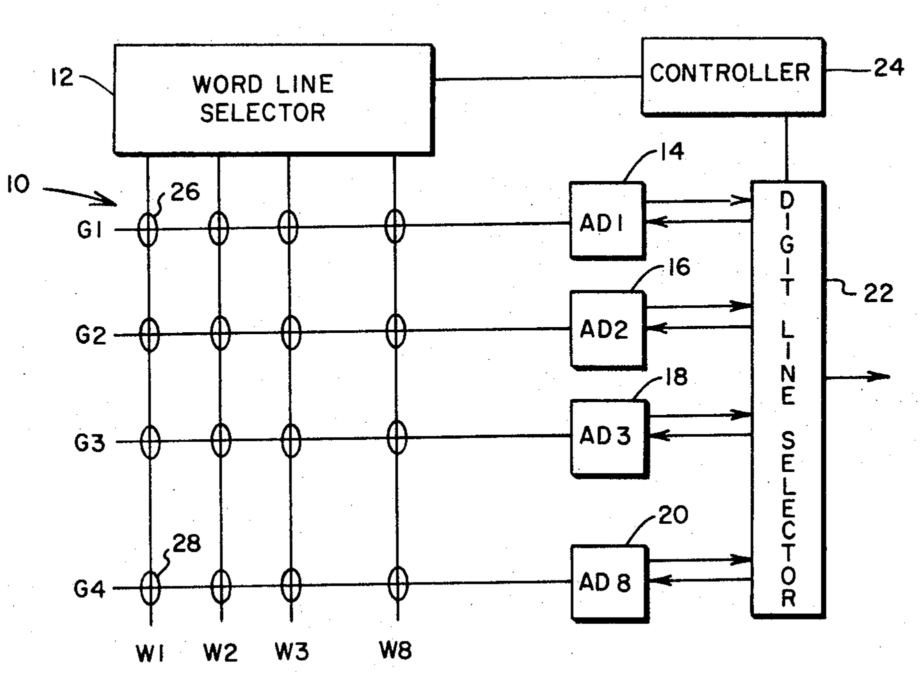
FIG. 1 is a block diagram of a memory system incorporating the present invention.

With particular reference to FIG. 1 there is presented a block diagram of an oligatomic magnetizable memory system in which the present invention is incorporated. Memory system 10 is comprised of a plurality of vertically oriented word lines W1, W2, W3 . . . W8 and a plurality of horizontally running groups of sense-digit lines G1, G2, G3 . . . G8. Each group of sense-digit lines, e.g., group G1, includes, e.g., 8 active sense-digit lines and one associated dummy sense-digit line. All of the word lines W1, W2, W3 . . . W8 are coupled to a word line selector 12 for selecting one of the plurality of associated word lines while all of the groups of sense-digit lines G1, G2, G3 . . . G8 are coupled to respectively associated active line, dummy line selectors 14, 16, 18 . . . 20, respectively, for selecting one active line, dummy line pair of each of the respectively associated group of sense-digit lines. Coupled to the sense-digit line selectors 14, 16, 18 . . . 20 is a digit line selector 22 for providing the proper signals and controls thereto whereby digit line selector 22, under control of controller 24, selects the one like-ordered active line A1–A8 of each group G1–G8 of sense-digit lines, and also the one associated dummy line D1, while concurrently word line selector 12 provides the proper signals and controls to the one selected word line W1–W8.

Figures 2, 3:
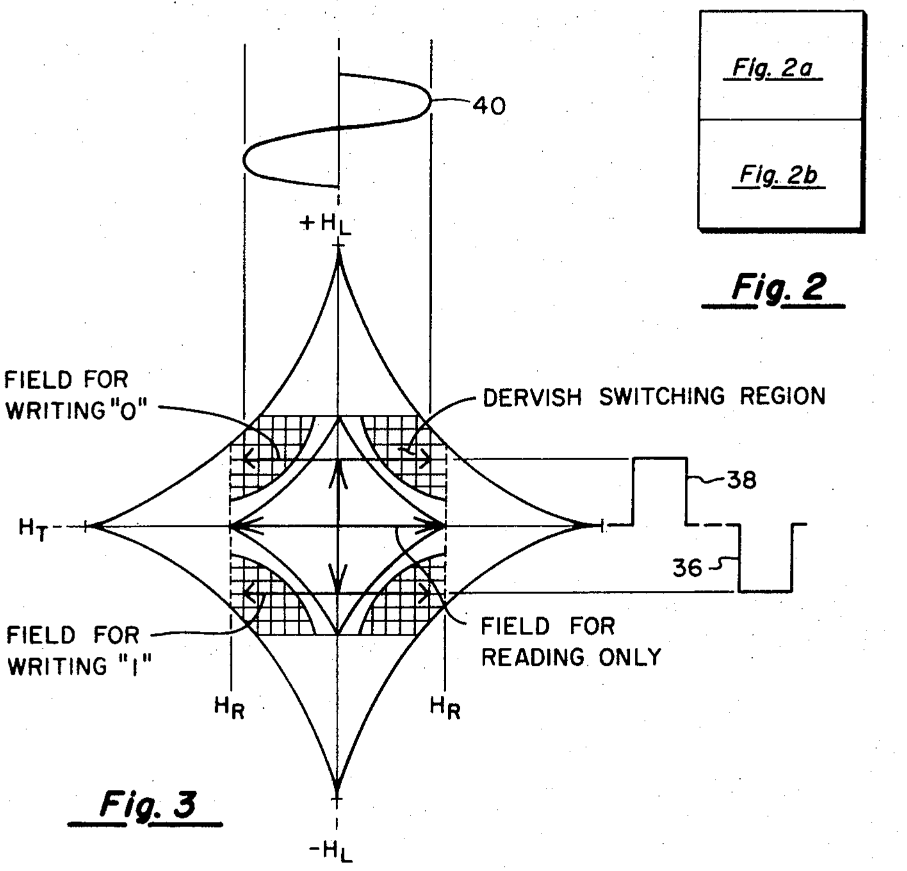
FIG. 2 is comprised of FIGS. 2*a* and 2*b* and is a circuit schematic of the active wire, dummy line selector of the present invention.
FIG. 3 is an illustration of a switching astroid and the associated drive signals that are associated with the operation of the system of FIG. 2.
Figure 2A:
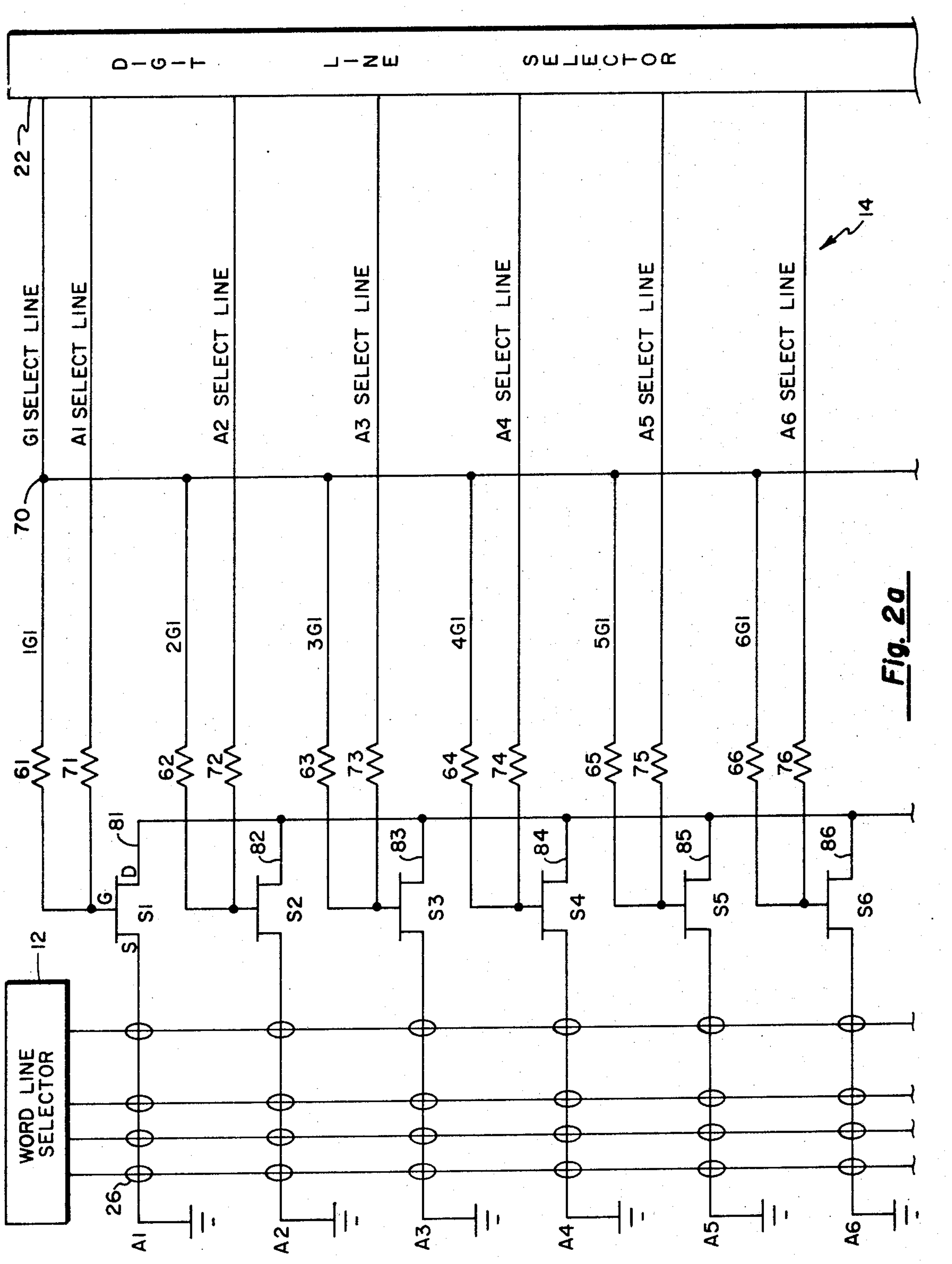
Figure 2B:
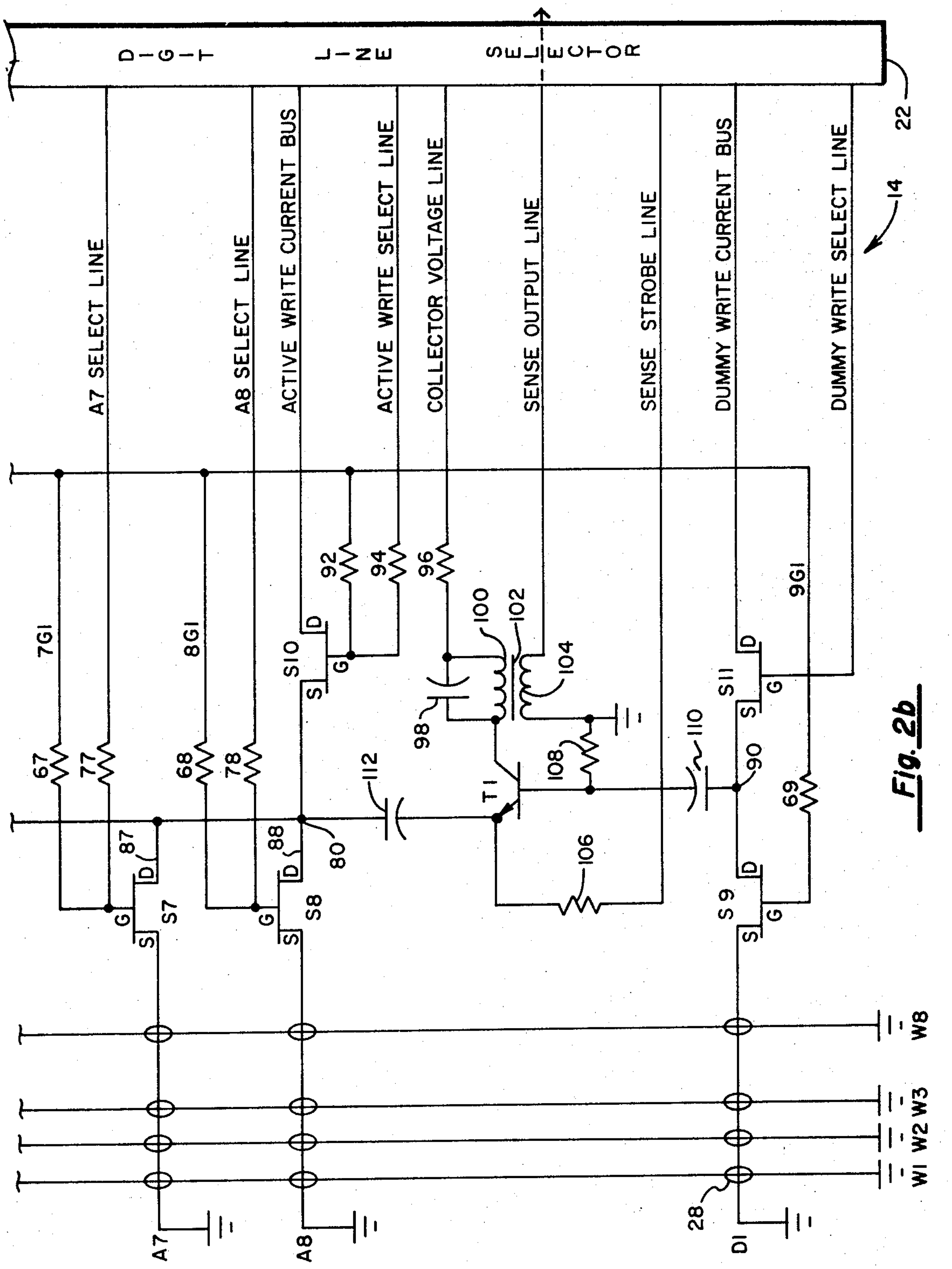

With particular reference to FIG. 2 there is presented a circuit schematic of the active line, dummy line selectors 14, 16, 18 . . . 20 of FIG. 1. Selector, e.g., 14 is selectively coupled to one of the eight ordered active lines A1–A8 and the one dummy line D1 of group G1 for:

- concurrently selecting one active line, e.g., A1 and the one dummy line D1 for readout of the information state of the one selected memory element 26 and the one reference element 28 that are at the intersections of the one selected active line A1 and the one selected dummy line D1, respectively, with the one word line, e.g., W1 that is concurrently selected by word line selector 12;
- concurrently selecting one active line, e.g., A1 for write-in of the information state of the one memory element 26 that is at the intersection of the one selected active line, e.g., A1 and the one word line, e.g., W1 that is concurrently selected by word line selector 12;
- concurrently selecting the one dummy line A1 for write-in of the reference state of the one reference element 28 that is at the intersection of the one selected dummy line D1 and the one word line, e.g., W1 that is concurrently selected by word line selector 12.

As discussed above with particular reference to FIG. 1, each multibit word that is stored in memory system 10 is oriented along a single word line while the bits of each word along such single word line are defined by the memory elements at the intersections of each like-ordered active line of each group of active lines. Thus, with the active lines of each group arranged in the order A1, A2, A3 . . . A8 the like-ordered active line of the groups G1, G2, G3 . . . G8 are associated with the like-ordered bits of the one selected multibit word that is oriented along the concurrently selected one word line. That is, e.g., when the like-ordered active line A1 of groups G1, G2, G3 . . . G8 and the one selected word line W1 are concurrently selected, the effected 8 bits (1 bit of each of the eight groups) are concurrently read out of the associated selector 14, 16, 18 . . . 20 to form the associated 8-bit word. Further, as each group includes eight active lines it is apparent that each word line must then include eight multibit words each of 8-bits in length. Accordingly, as there are illustrated eight word lines, memory system 10 of FIG. 1 has a capacity of 64 8-bit words; however, it is apparent that the principles of such system do not limit the storage capacity to any particular size.

With particular reference to FIG. 3 there is presented an illustration of a switching astroid and associated drive signals that are associated with the memory element 26 and reference element 28 of memory system 10 of FIGS. 1, 2. FIG. 3 is a reproduction of FIG. 4 of the above referenced D. S. Lo et al. U.S. Pat. No. 3,550,101 which patent describes the oligatomic memory system to which the preferred embodiment of the present invention is designed to control; however, it is to be appreciated that the specific application discussed herein is not to be construed as limiting the potential applications of the present invention. FIG. 3 is presented as a means of incorporating by reference the teaching of such D. S. Lo et al. patent and as presenting an exemplary illustration of the signal wave forms associated with the selectors 14, 16, 18 . . . 20 of FIGS. 1, 2.

Selector 14 of FIG. 2 is designed to selectively couple the bipolar pulses 36, 38, which are DC longitudinal drive fields $\pm H_L$ to memory element 26 (and reference element 28) when concurrently effected by the AC transverse $H_T$ drive field 40 for setting the effected memory element 26 into the associated "1" or "0" information state. As noted in such D. S. Lo et al. patent the amplitude and frequency of the transverse $\pm H_T$ drive field 40 that is coupled to the memory element 26 by the word line W1–W8 and word line selector 12 is insufficient by itself to cause any substantial destruction of the information stored in the effected memory element 26, and, consequently, does alone provide NDRO of the effected memory element 26 (or reference element 28). Additionally, the amplitude of the DC longitudinal $\pm H_L$ drive fields 36 or 38 that are coupled to the sense-digit lines by selector 14 when combined with the $\pm H_T$ drive field 40 is just sufficient to establish the magnetic state of the effected memory element 26 into the associated "1" or "0" information state within the Dervish switching region of the switching astroid of the effected memory element 26 (or reference element 28).

With reference back to FIG. 2 the operation thereof shall now be described. The circuit schematic shows the sense-digit line low level, semiconductor bidirectional switches S1–S9 as being FET transistors which are capable of passing or blocking a bipolar (AC or pulsed DC) signal from or to the associated sense-digit lines, i.e., active lines A1–A8 and dummy line D1. These switches S1–S8 and their associated A1–A8 select lines and group G1 select line function as a resistor-switch matrix whereby the selection of the one group G1 select line and one of the A1–A8 select lines turns ON the one fully selected switch S1–S8 that is at the intersection of the two concurrently half-selected lines. This addressing of a single active line is accomplished by ORing the group select lines 1G1–8G1 (and their associated resistors 61–68, which are in turn coupled to the gate (G) of the associated FET transistors of switches S1–S8, respectively) at a common node 70, to the single group G1 select line for half-selecting all of the associated switches S1–S8. To fully select or address one of the switches S1–S8 the associated A1–A8 select line (and their associated resistors 71 – 78, which are in turn coupled to the gate of the associated FET transistors of the switches S1–S8, respectively) is concurrently selected turning the one fully selected FET transistor ON permitting signals to pass through its drain-source (D–S) junction to or from the one associated fully-selected active line A1–A8 along the associated lines 81 – 88, respectively, which OR the drain electrodes of the associated FET transistors at a common node 80.

In the preferred embodiment of FIG. 2 the following illustrative select signal relationships are utilized to address one of the active lines.

a. The group of active lines A1–A8 are normally electronically disconnected from node 80 when 1. G1 select line is at −10 volts.
2. A1–A8 select lines are at −10 volts.

b. The group of active lines A1–A8 are half-selected when

1. G1 select line is at ground potential.
2. A1–A8 select lines are at −10 volts.

c. One of the active lines A1–A8 of the half-selected group G1 is fully selected when the one selected, e.g., A1 select line is at ground potential while concurrently the G1 select line is at ground potential.

This above addressing scheme selects the one desired active line A1–A8 of selector 14 whereby the read/-write signals are permitted to pass through the one associated switch S1–S9. As noted in the D. S. Lo et al. patent a word line AC drive signal, provided by word line selector 12, is utilized for both reading and writing. Such word line AC drive signal generates the sense output signal in the fully selected active line that is gated through the one associated switch S1–S9 during the read cycle and enables the write-in of the logic "1" or "0" during the write cycle. Accordingly, although such AC drive signal is not generated by selector 14 it is necessary to include it in a discussion of the operation of selector 14 to fully understand the operation thereof.

Figure 4:
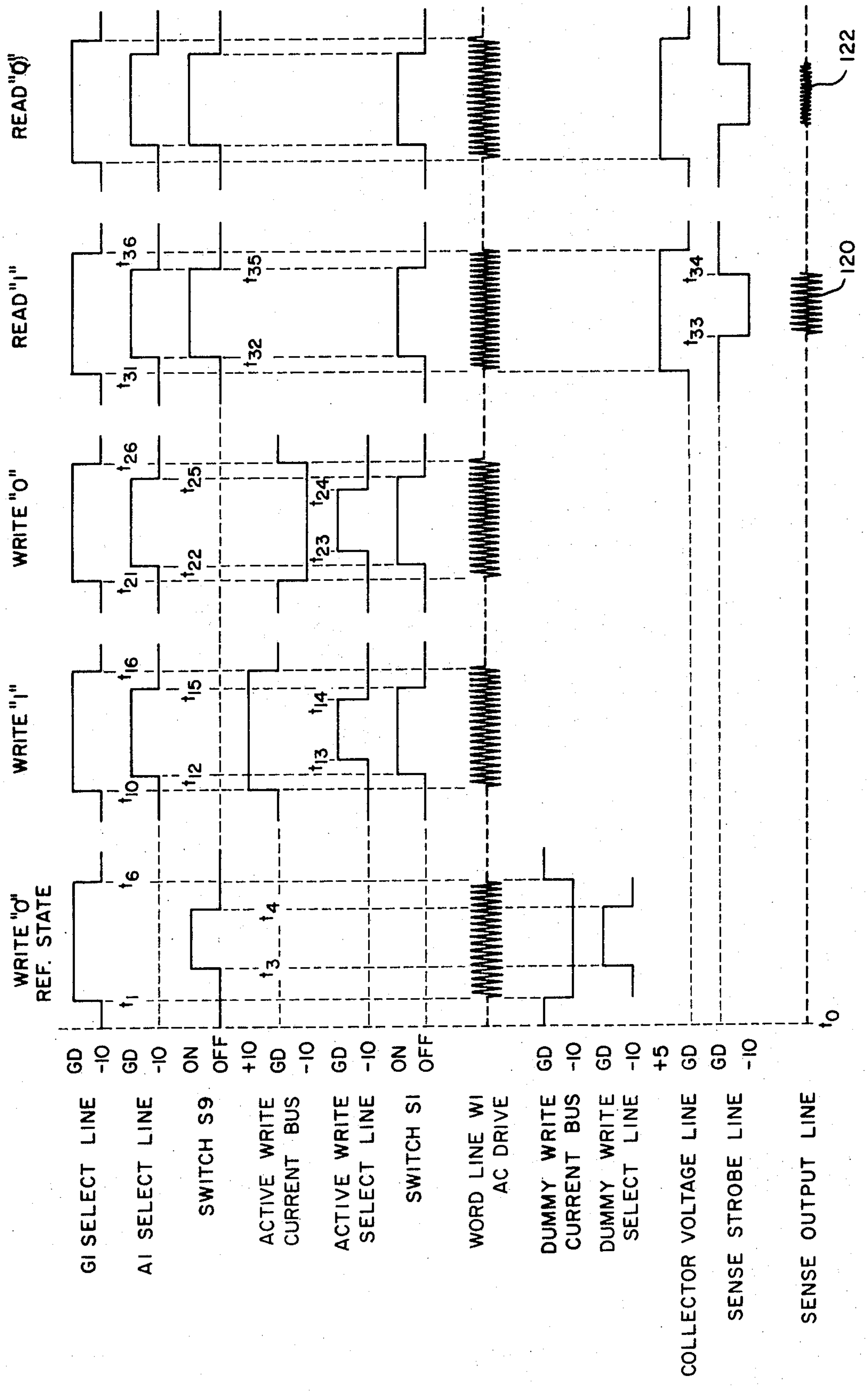
FIG. 4 is an illustration of the timing diagram of the signals associated with the operation of the system of FIG. 2.

With particular reference to FIG. 4 there is presented an illustration of a timing diagram of the signal wave forms associated with the operation of selector 14 of FIG. 1, 2. Initially, as at time $t_0$, all FET switches S1–S11 and transistor amplifier T1 are biased nonconducting or OFF whereby the group of active lines A1–A8 and the one dummy line D1 are electronically disconnected from their associated nodes 80 and 90, respectively.

For the write-in of the logic "0" reference state in reference element, e.g., 28 on dummy line D1, G1 select line is switched from a −10 volt level to ground potential as at time $t_1$ for half-selecting all active lines A1–A8 and dummy line D1. Concurrently, the dummy write current bus is switched from ground potential to a −10 volt level. Subsequently, as at time $t_3$, the dummy write select line through the gate G of the FET of switch S11 biases the FET of switch S11 ON by switching from a −10 volt level to ground potential. Switch S11 then gates the negative dummy write current bus pulse over the duration $t_3$–$t_4$ of the dummy write select signal through switch S11, node 90, switch S9 and thence along dummy line D1. The negative dummy write current pulse conjointly with the word line W1 AC drive signal sets the reference element 28 at the intersection of dummy line D1 of the group G1 and word line W1—see FIG. 1—into the logic "0" reference state in the manner similar to that disclosed in the D. S. Lo et al. patent. Subsequently, as at time $t_6$, G select line is switched back to its normal −10 volt level and dummy write current bus is switched back to its normal ground potential. Thus, at time $t_6$ all switches S1–S11 are again OFF.

For the write-in of a "1" in memory element, e.g., 26 on active line, e.g., A1, G1 select line is switched from a −10 volt level to ground potential as at time $t_{10}$ for half-selecting all active lines A1–A8 and dummy line D1. Concurrently, the active write current bus is switched from ground potential to a +10 volt level. Subsequently, as in time $t_{12}$, A1 select line is switched from a normal −10 volt level to a ground potential for fully-selecting the active line A1. Switch S1 is now biased ON to pass a signal therethrough. Next, as at time $t_{13}$, the active write select line, through the resistor 92, 94 biasing network to node 70, biases the FET of switch S10 ON by switching from a normal −10 volt level to ground potential. Switch S10 then gates the positive active write current pulse over the duration $t_{13}$–$t_{14}$ of the active write select signal duration through node 80, line 81 and switch S1 and thence along active line A1. The positive active write current pulse conjointly with the word line W1 AC drive signal sets the memory element 26 at the intersection of the active line A1 of the group G1 and word line W1—see FIG. 1—into a logic "1" state in a manner similar to that disclosed in the D. S. Lo et al. patent. Subsequently, as at time $t_{15}$, A1 select line is switched back to its normal −10 volt level turning switch S1 OFF and at time $t_{16}$ G1 select line is switched back to its normal −10 volt level and active write current bus is switched back to its normal ground potential. Thus, at time $t_{16}$, all switches S1–S11 are again OFF.

For the write-in of a "0" in memory element, e.g., 26 on active line, e.g., A1, G1 select line is switched from a −10 volt level to ground potential as at time $t_{21}$ for half-selecting all active lines A1–A8 and dummy line D1. Concurrently, the active write current bus is switched from ground potential to a −10 volt level. Subsequently, as at time $t_{22}$, A1 select line is switched from a normal −10 volt level to a ground potential for fully selecting active line A1. Switch S1 is now biased ON to pass a signal therethrough. Next, as at time $t_{23}$, the active write select line, through the resistor 92, 94 biasing network to node 70, biases the FET of switch S10 ON by switching from a normal −10 volt level to ground potential. Switch S10 then gates the negative active write current pulse over the duration $t_{23}$–$t_{24}$ of the active write select signal duration through node 80, line 81 and switch S1 and thence along active line A1. The negative active write current pulse conjointly with the word line W1 AC drive signal sets the memory element 26 at the intersection of active line A1 of group G1 and word line W1—see FIG. 1—into a logic "0" state in a manner similar to that disclosed in the D. S. Lo et al. patent. Subsequently, as at time $t_{25}$, A1 select line is switched back to its normal −10 volt level turning switch S1 OFF and at time $t_{26}$ G1 select line is switched back to its normal −10 volt level and active write current bus is switched back to its normal ground potential. Thus, at time $t_{26}$ all switches S1–S11 are again OFF.

For the readout of a "1" or of the "0" from a memory element, e.g., 26 along an active line, e.g., A1 at the intersection of the word line, e.g., W1, one active line, e.g., A1 of the group G1 of active lines A1–A8 and the one associated dummy line D1 are concurrently addressed or selected. Transistor amplifier T1 functions as a linear differential amplifier of the bidirectional signals that are representative of the readout of a "1" or "0" remanent state of the memory element 26 as long as these signal levels are much less than $V_{BE}$ of the transistor used. The memory element 26 "1" or "0" output signal at node 80 and the reference element 28 "0" output signal at node 90 produce a significant sense output signal for the readout of a "1" and an insignificant sense output signal for the readout of a "0" on the sense output line.

As in the active line write operation, G1 select line is switched from a −10 volt level to ground potential as at time $t_{31}$ for half-selecting all active lines A1–A8 and dummy line D1. Concurrently, the collector voltage line, through resistor 96 and the parallel coupled capacitor 98 and winding 100 of transformer 102 to the collector electrode of transistor T1, is switched from its normal ground potential to a +5.0 volt level. Subsequently, as at time $t_{32}$, the A1 select line is switched from its normal −10 volt level to a ground potential for fullyselecting active line A1. Switch S1 is now biased ON to pass a signal therethrough along its associated drain (D) conductor 81 to node 80 through coupling-/decoupling capacitor 112 to the emmitter electrode of transistor T1. At this time $t_{32}$ both switch S1 and S9 are ON passing therethrough the respective signals generated therein by the effect of the word line W1 AC drive signal; however, transistor T1 is still biased OFF by the effect of base grounding resistor 108 and the collector-emitter voltages.

Next, as at time $t_{33}$, the sense strobe line through resistor 106 through the emitter electrode of tansistor T1 switches from its normal ground potential to a −10 volt level turning transistor T1 ON. Now, the "1" or "0" data state output signal at node 80 through coupling-/decoupling capacitor 112 and the emitter electrode of transistor T1 and the "0" reference state at node 90 through coupling/decoupling capacitor 110 and the base electrode of transistor T1 are differentially amplified by transistor T1 over the sense strobe duration $t_{33}$–$t_{34}$ providing a resulting output signal through winding 104 of transformer 102 on the sense output line. Accordingly, if the memory element 26 stored a "1" data state the "0" reference state of reference element 28 on dummy line D1 would provide a significant output signal 120 on the sense output line; however, if the memory element 26 on the active line A1 stored a "0" data state the "0" reference state of reference element 26 on dummy line D1 would provide an insignificant output signal 122 on the sense output line. Transformer winding 100 and capacitor 98 form a resonant circuit of moderate Q value to further amplify the more important frequency components of the sense signals while filtering the unwanted or noisy components. Subsequently, as at time $t_{35}$, A1 select line is switched back to its normal −10 volt level turning switch S1 OFF and at time $t_{36}$ G1 select line is switched back to its normal −10 volt level and the collector voltage line is switched back to its normal ground potential. Thus, at time $t_{36}$ all switches S1–S11 are again OFF.

In order to facilitate an understanding of the operation of the present invention, the following group of actual values for the components of the illustrated embodiment are presented. It should be understood that the principles of operation of this circuit may be present in circuits having a wide range of individual specifications, so that the list of values here presented should not be construed as a limitation thereto.

| | |
|---|---|
| 1. Transformer **102** | |
| a. Core | ¼ inch O.D. × 1/16 inch H |
| b. Windings | |
| **100** | 30 Turns |
| **104** | 4 Turns |
| 2. Transistors | |
| a. FET Switches | |
| S1–S11 | 2N4856 |
| b. Transistor Amplifier | |
| T1 | 2N2222 |
| 3. Resistors | |
| a. **61–69** | 10K |
| b. **71–78** | 10K |
| c. **92** | 10K |
| d. **94** | 10K |
| e. **96** | 1K |
| f. **106** | 2.7K |
| g. **108** | 2.7K |
| 4. Capacitors | |
| a. **98** | 10μμf |
| b. **110** | 680μμf |
| c. **112** | 680μμf |

What is claimed is:

1. A selection system for selectively writing into or reading out of any one of a plurality of active lines or a dummy line of a memory array, comprising:

a memory array including a group of active lines and an associated dummy line, and an orthogonally arranged plurality of word lines for defining a memory element at each word line, active line intersection and a reference element at each word line, dummy line intersection;

a word line selector for selectively coupling an AC signal to a selected one of said word lines;

a plurality of semiconductor bidirectional active line swtiches having first and second signal electrodes and a gate electrode;

a semiconductor bidirectional dummy line switch having first and second signal electrodes and a gate electrode;

means for separately coupling the first signal electrode of each of said active line switches to an associated one of said active lines;

means for coupling the first signal electrode of said dummy line switch to said dummy line;

means for coupling the second signal electrodes of all of said active line switches to a common active line node;

means for coupling the second signal electrode of said dummy line switch to a dummy line node;

selector means coupled to the gate electrodes of said active line switches and said dummy line switch for selectively passing a signal between the first and second signal electrodes of a selected one of said active lines and of said dummy line, respectively;

a semiconductor bidirectinal active write current switch having first and second signal electrodes and a gate electrode;

a semiconductor bidirectional dummy line current switch having first and second signal electrodes and a gate electrode;

means for coupling the first signal electrode of said active write current switch to said active line node;

means for coupling the first signal electrode of said dummy line current switch to said dummy line node;

active line write means included in said selector means and coupled to the second signal electrode and the gate electrode of said active write current switch for selectively coupling a selected first or second and opposite polarity write signal to said active line node and thence to a selected one of said active line switches and the associated active line in concurrence with said word line selector AC signal being coupled to a selected one of said word lines and setting the concurrently affected memory element into a selected first or second memory state;

dummy line write means included in said selector means and coupled to the second signal electrode and the gate electrode of said dummy write current switch for selectively coupling a selected first polarity write signal to said dummy line node and thence to said dummy line through the selected dummy line switch in concurrence with said word line selector AC signal being coupled to a selected one of said word lines and setting the concurrently affected reference element into a reference state;

differential amplifier means having first and second input terminals and an output terminal;

first and second capacitor means for coupling said differential amplifier means first and second input terminals, respectively, to said active line node and to said dummy line node, respectively, for differentially amplifying the AC signals coupled to said active line node and to said dummy line node when said selector means concurrently selects one of said active lines and said dummy line by enabling the associated active line switch and dummy line switch to pass the AC signals on the associated active line and dummy line when affected by said word line selector AC signal.

2. The selection system of claim 1 further including:

transformer means having first and second windings each having first and second terminals;

third capacitor means coupled across said first winding first and second terminals;

means coupling the first winding first terminal of said transformer means to the output terminal of said differential amplifier means;

means included in said selector means for coupling a first control signal to the first winding second terminal of said transformer means;

means included in said selector means for coupling a sense strobe signal to the first input terminal of said differential amplifier means;

means coupled to the second winding second terminal of said transformer means for sensing as the output of said memory array the difference signal of the AC signals coupled to said dummy line node by said dummy line and to said active line node by said one selected active line when said first control signal and said sense strobe signal are concurrently coupled to said differential amplifier means.

* * * * *